US008808931B2

(12) United States Patent
Goltz et al.

(10) Patent No.: US 8,808,931 B2
(45) Date of Patent: Aug. 19, 2014

(54) ION EXCHANGE FILTER FOR FUEL CELL SYSTEM

(75) Inventors: Harlan Robert Goltz, Midland, MI (US); Marvin H. Tegen, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 941 days.

(21) Appl. No.: 11/971,232

(22) Filed: Jan. 9, 2008

(65) Prior Publication Data

US 2009/0176131 A1   Jul. 9, 2009

(51) Int. Cl.
*H01M 8/06* (2006.01)
*H01M 8/02* (2006.01)

(52) U.S. Cl.
CPC .... *H01M 8/0293* (2013.01); *H01M 2300/0085* (2013.01); *H01M 2300/0082* (2013.01); *Y02E 60/50* (2013.01)
USPC .......................................... 429/410; 429/417

(58) Field of Classification Search
CPC .......... H01M 8/0293; H01M 8/04074; H01M 8/04044; H01M 8/04208; H01M 8/04723; H01M 8/04828; H01M 2300/0082; H01M 2300/0085; Y02E 60/50
See application file for complete search history.

(56) References Cited

U.S. PATENT DOCUMENTS

| 5,488,184 | A  | 1/1996  | Reman et al. |
| 6,211,419 | B1 | 4/2001  | Strickler et al. |
| 6,448,456 | B1 | 9/2002  | Strickler et al. |
| 6,663,993 | B2 | 12/2003 | Imaseki et al. |
| 6,673,482 | B2 | 1/2004  | Imazeki et al. |
| 6,756,462 | B2 | 6/2004  | Pafford et al. |
| 7,097,763 | B2 | 8/2006  | Takemoto et al. |
| 7,261,816 | B2 | 8/2007  | Suzuki et al. |
| 7,300,719 | B2 | 11/2007 | Abd Elhamid et al. |
| 2004/0028971 | A1 | 2/2004 | Wenderoth et al. |
| 2005/0115884 | A1* | 6/2005 | Suzuki et al. ............... 210/282 |
| 2005/0235615 | A1 | 10/2005 | Nyman et al. |
| 2006/0093879 | A1* | 5/2006 | Yang et al. ................... 429/17 |
| 2006/0211125 | A1* | 9/2006 | Liu et al. ..................... 436/161 |
| 2007/0259241 | A1 | 11/2007 | Miyamoto et al. |
| 2008/0011674 | A1 | 1/2008 | Nakagaki et al. |

FOREIGN PATENT DOCUMENTS

| EP | 1791206 A1 | 1/2008 |
| JP | 1133548 | 5/1989 |
| JP | 5192592 | 8/1993 |
| JP | 1133548 | 2/1999 |
| JP | 2002-343388 | 11/2002 |
| JP | 200234388 | 11/2002 |
| JP | 2008269807 | 11/2006 |
| JP | 2005-33981 | 1/2008 |
| JP | 2008206899 | 9/2008 |
| WO | WO-2008030299 | 3/2008 |

OTHER PUBLICATIONS

Masuda et a; "Thermally stable anion exchange resin (Diaion XSA series): Characteristics and application", Ion Exchange at the Millenium, J.A Greig Ed. Proceedings of TEX 200, pp. 253-260. 2000.*
Ion Exchange at the Millennium, Proceedings of IEX 2000, ed. JA Greig, ICP (2000), pp. 253-260.
Ion Exchange Developments and Applications, Proceedings of IEX 1996, ed. JA Greig, SCI (1996), pp. 182-192.
Thermal Decomposition of Amberlite IRA-400, E. Baumann, Journal of Chemical and Engineering Data, vol. 5, No. 3, Jul. 1960, pp. 376-382.

* cited by examiner

*Primary Examiner* — Raymond Alejandro
(74) *Attorney, Agent, or Firm* — Edward W. Black

(57) ABSTRACT

The present invention is directed toward ion exchange filters useful in fuel cell systems, fuel cell systems including ion exchange filters and methods for treating fluid of fuel cells. One embodiment of the invention includes a cartridge containing an anion exchange resin in bicarbonate form. The invention is particularly useful in connection with vehicle mounted fuel cell systems.

8 Claims, 2 Drawing Sheets

ION EXCHANGE FILTER FOR FUEL CELL SYSTEM

BACKGROUND OF THE INVENTION (1) Field of the Invention

The present invention is directed toward ion exchange filters useful in fuel cell systems, fuel cell systems including ion exchange filters and methods for treating fluid of fuel cells.

(2) Description of the Related Art

The design and operation of fuel cells are well known in the art. Fuel cells generate electricity through an electrochemical oxidation of a fuel, e.g. hydrogen, methanol, etc. Unreacted fuel and/or oxidant (exhaust) are often recycled and reintroduced into the fuel cell. Recycled constituents may be filtered with ion exchange filters to remove contaminates prior to being reintroduced into the fuel cell. Such contaminates include degradation and/or elution products of various system components, e.g. membrane, piping, coolant, catalysts, etc., along with impurities that may be introduced with the fuel and oxidant. By way of example, US 2007/0259241 describes a fuel cell system including a hydrogen recycle system for directing unreacted hydrogen exhaust and water from the fuel cell to gas-liquid separator. The resulting exhaust gas is then passed through an ion exchange filter prior to being recycled back to the fuel cell for subsequent reaction. JP 2005/339814A describes a similar fuel cell system including a hydrogen recycle system including an ion exchange filter.

Fuel cell systems often including coolant systems which circulate coolant fluid between a fuel cell and a heat exchanger. Ion exchange filters are also used in such coolant systems to remove debris and elution products from the recirculation coolant. Examples of such systems are described in: U.S. Pat. No. 7,261,816; U.S. Pat. No. 6,673,482; U.S. Pat. No. 6,663,993; US 2004/0028971 and EP 1 791 206.

Ion exchange filters used in such fuel cell applications typically comprise a cartridge including fluid flow passages to permit fluid of a fluid circuit to pass through. A wide variety of cartridges are known including those described in U.S. Pat. No. 7,261,816 and JP 2005/339814A. A cartridge can be combined with a gas-liquid separator as described in US 2007/0259241. The cartridge contains an ion exchange resin which removes ions or other charged constituents from the fluid passing in contact with the resin. JP 2002-343388 describes the use of a mixed bed of ion exchange resins for filtering product water and/or coolant within a phosphoric acid fuel cell.

Given the high operating temperatures of fuel cells, the ion exchange resins used in such systems must have high temperature stability, i.e. the resin must maintain ion exchange capacity even after prolonged exposed to high temperatures, e.g. temperatures above about 80° C. and in many instances temperatures above 100° C. or even 120° C. JP 2002-343388 describes a class of anion exchange resins in hydroxide ($OH^-$) form for use in such applications.

In addition to being exposed to high operating temperatures, ion exchange filters of fuel cell systems may also be exposed to repeated freeze/thaw conditions—particularly with respect to vehicle mounted fuel cell systems. Repeated freezing and thawing creates mechanical forces that tend to break-up ion exchange resins and result in undesired pressure drop within the fluid circuit.

BRIEF SUMMARY OF THE INVENTION

The present invention includes an ion exchange filter useful in fuel cell systems. The invention further includes fuel cell systems including ion exchange filters and methods for treating fluid of fuel cells. In one embodiment, the subject ion exchange filter comprises a cartridge including at least one fluid flow passage and an anion exchange resin in bicarbonate and/or carbonate form disposed within said cartridge. The subject anion exchange resins of the invention exhibit high temperature stability along with improved mechanical stability even after repeated exposure to freeze/thaw conditions. Many additional embodiments, objectives, advantages and features are also disclosed.

DETAILED DESCRIPTION OF THE INVENTION

Figure 1:
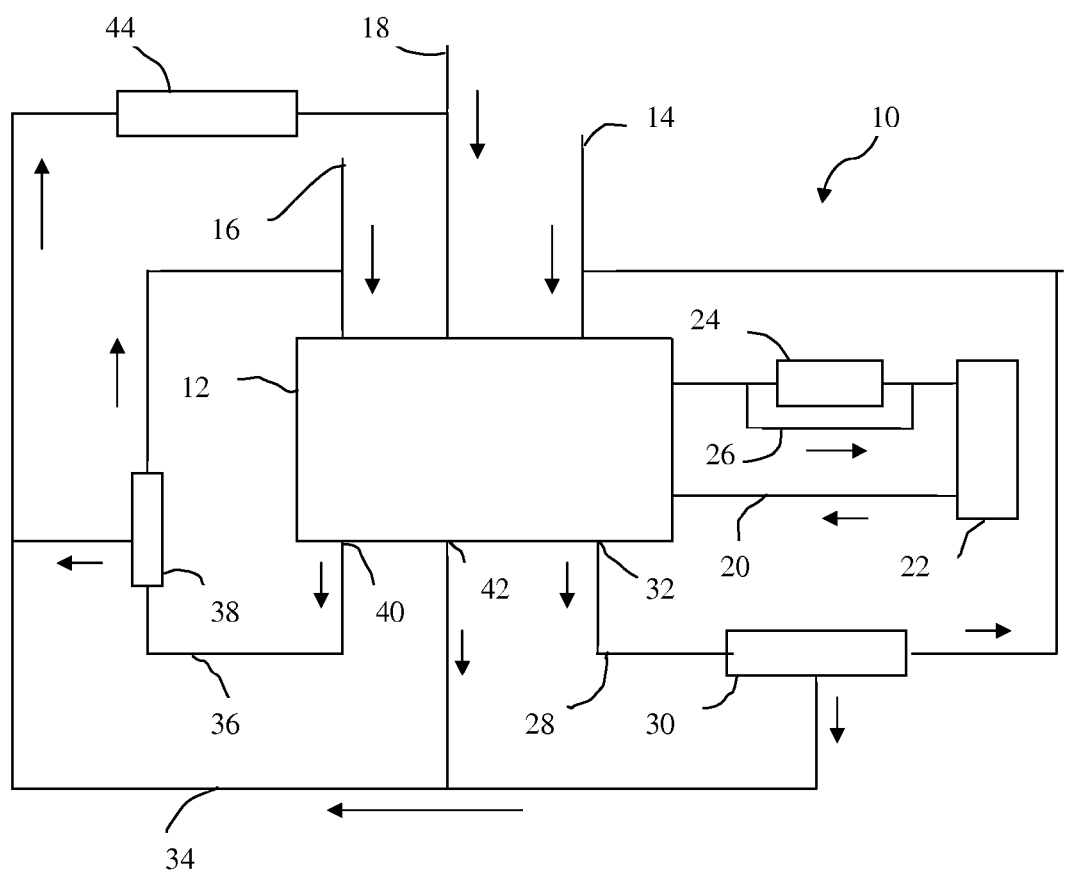
FIG. 1 is a schematic diagram of a fuel cell system according an embodiment of the invention.

Preferred embodiments of the invention are described with reference to the attached drawings. The embodiments set forth are for the purpose of describing the invention. It will be understood that the invention is not limited to the particular embodiments described but covers modifications, equivalents, and alternatives of the invention falling within the spirit and scope of the disclosure. It will be further understood that certain features and sub-combinations are of utility and may be employed without reference to other features and sub-combinations.

For the sake of brevity, the present description focuses upon hydrogen fuel cells but the present invention is applicable to other fuel cells including but not limited to hydrocarbon fuel cells, including diesel, methanol and chemical hydrides.

In one embodiment the present invention is directed toward a method of treating fluid of a fuel cell by contacting such fluid with anion exchange resin in an anionic form selected from at least one of: bicarbonate and carbonate. In a preferred mode, the method includes the step of passing at least a portion of fluid exiting the fuel cell through an ion exchange filter before returning at least a portion of the fluid to the fuel cell.

Another embodiment of the invention is directed toward a fuel cell system comprising at least one fuel cell, at least one fluid circuit and an ion exchange filter. The type of fuel cell is not particularly limited. In general terms, a preferred class of fuel cells comprise a fuel electrode (anode) and an oxidizer electrode (cathode) separated by an electrolytic membrane. In operation, fuel (e.g. hydrogen gas) is passed through channels adjacent to the anode while an oxidant, (e.g. air) is passed through channels adjacent to the cathode. At the anode, a platinum catalyst causes hydrogen to split into positive hydrogen ions (protons) and negatively charged electrons. The electrolyte membrane only allows positively charged ions to pass through it to the cathode. The negatively charged electrons travel along an external circuit to the cathode thereby creating an electrical current. At the cathode, the electrons and positively charged hydrogen ions combine with oxygen to form water which flows from the cell. The electrochemical reactions may be represented by the following formulae:

Reaction at the fuel electrode (anode): $H_2 \rightarrow 2H^+ + 2e^-$

Reaction at the oxidizer electrode (cathode): $2H^+ + 2e^- + (\frac{1}{2})O_2 \rightarrow H_2O$ Overall reaction: $H_2 + (\frac{1}{2})O_2 \rightarrow H_2O$ In most embodiments, a plurality of cells are combined to form a fuel cell stack, an example of which is described in EP 1 791 206.

In a preferred embodiment, the fuel cell system includes at least one fluid circuit. The fluid circuit defines a continuous fluid flow path extending from the fuel cell to a remote location and returning back to the fuel cell. As used in this context, the term "continuous" does not mean that fluid constantly flows along the fluid flow path. Indeed, in many embodiments the flow of fluid through the circuit may be interrupted or re-directed by use of values or other similar means. Rather, the term is intended to describe a fluid loop capable of re-circulating and/or recycling fluid from and to the fuel cell. The fluid circuit may comprise piping, valves, regulators and/or pumps for transferring fluid as are well known in the art. Examples of fluid circuits include: coolant systems, humidifying systems, fuel recycle systems and oxidant recycle systems. A fuel cell system may include one or more of such fluid circuits or any combination thereof. In some instances, individual fluid circuits may be combined, e.g. a humidifying system may be combined with a fuel recycle system or oxidant recycle system. In such combined or hybrid systems, a gas-liquid separator may also be included. In a preferred embodiment, an ion exchange filter is position along the fluid flow path of the fluid circuit. However, if more than one fluid circuit is utilized within a fuel cell system, an ion exchange filter may not be required for each fluid circuit.

Cooling systems applicable to the present invention are not particularly limited and typically comprise a coolant re-circulating within pipes or tubing between a remote heat exchanger and the fuel cell. The heat exchanger may be in fluid communication with a radiator, heat regulators, and/or by-pass means for selectively filtering circulating coolant as described in U.S. Pat. No. 6,673,482, the entire disclosure of which is incorporated herein by reference. Additional examples of cooling systems are provided in U.S. Pat. No. 6,663,993; U.S. Pat. No. 7,261,816, the entire disclosures of which are incorporated herein by reference. The coolant is not particularly limited but typically comprises low conductivity fluids such as purified water or an aqueous alkylene glycol mixture. Various additives may be included in the coolant, including orthosilicic acid derivatives as described in US 2004/0028971, the entire disclosure of which is incorporated herein by reference. Other designs and coolants are well known and may be used, including those described in EP 1 791 206.

Humidifying systems are designed to capture water produced by the fuel cell and return or "recycle" at least a portion of the water back to the fuel cell. The humidifying system provides moisture to the fuel cell which may be desirable to maintain the operating performance of certain electrolyte membranes. Depending upon the specific fuel cell and operating requirements, the recycled water may be combined with fresh water, fuel and/or oxidant prior to introduction to the fuel cell. Prior to introduction to the fuel cell, water produced from the fuel cell preferably flows through an ion exchange filter, such as by way of an in-line cartridge including ion exchange resin to remove contaminates such as elution constituents or contaminates introduced into the cell with the fuel or oxidant. An example of a humidifying system is provided in U.S. Pat. No. 7,261,816, the entire disclosure of which is incorporated herein by reference. The humidifying system may be integrated with another fluid circuit such as a fuel and/or oxidant recycle system. Such combined systems may include a gas-liquid separator for separation of liquid water from hydrogen or oxygen gas, as described in US 2007/0259241, the entire disclosure of which is incorporated herein by reference. Once separated from the exhaust gas, the water may be directed through an ion exchange filter before being reintroduced to the fuel cell.

A fuel recycle system may be included in the fuel cell system to capture at least a portion of unreacted fuel from the fuel cell and re-circulating the fuel to the fuel cell for subsequent reaction. The re-circulated fuel may be combined with a fresh source of fuel. The fuel recycle system preferable includes an in-line ion exchange filter for removing contaminates. As previously noted, the ion exchange filter may be combined with a gas-liquid separator as described in US 2007/0259241, the entire disclosure of which is incorporated herein by reference. Water separated from the fuel may be discarded or routed to a humidifying system as previously described.

An oxidant recycle system may be included in the fuel cell system to recover at least a portion of unreacted oxidant. In many instances, air is the preferred oxidant and no recovery is desired. However, in instances where oxygen gas or other oxidants are utilized, such a system may be desired. The oxidant recycle system preferable includes an in-line ion exchange filter for removing contaminates. As previously noted, the ion exchange filter may be combined with a gas-liquid separator. Water separated from the oxidant may be discarded or routed to a humidifying system as previously described.

While not critical for understanding the present invention, the invention is further described with reference to FIG. 1. A fuel cell system is generally shown at 10 including a fuel cell or stack 12 including a fuel inlet 14, oxidant inlet 16 and water inlet 18. Fuel and oxidant are provided to the cell 12 under pressure by way of a pump—not shown. The fuel cell system includes a coolant system 20 including a heat exchanger 22, ion exchange filter 24 and by-pass circuit 26 for selectively diverting coolant around the ion exchange filter 24. The fuel cell system also includes a fuel recycle system 28 including a combined ion exchange filter and gas-liquid separator 30. Unreacted fuel exits the fuel cell via an outlet 32 and passes through the ion exchange filter 30 and is recombined with fresh fuel near the fuel inlet 14. Water is separated from the fuel and directed to a humidifying system 34. The fuel cell system further includes an oxidant recycle system 36 including a combined ion exchange filter and gas-liquid separator 38. Unreacted oxidant exits the fuel cell via an outlet 40, passes through the ion exchange filter 38 and is recombined with fresh oxidant near the oxidant inlet 16. Water is separated from the oxidant and directed to the humidifying system 34. The humidifying system 34 collects water produced from the fuel cell via the fuel recycle system, the oxidant recycle system and a water outlet 42. The collected water passes through an ion exchange filter 44 and is subsequently combined with fresh water near the water inlet 18. The direction of fluid flow through the fuel cell system is shown by arrows.

As previously mentioned, the fuel cell system preferable includes an ion exchange filter positioned along the fluid flow path of the fluid circuit. The ion exchange filter comprises a cartridge including at least one (but preferably two or more) fluid flow passage(s) for permitting fluid to flow within the cartridge and into contact with an anion exchange resin disposed within the cartridge. The cartridge design is not particularly limited and many known designs may be used. A primary function of the cartridge is to enclose the anion exchange resin along the fluid path in a manner that permits fluid to come into contact with the resin while passing along the fluid flow path of the fluid circuit. Thus, the form of the resin will influence the design of the cartridge. For example, if the anion exchange resin is provided in a porous block or cylindrical form, the cartridge may simply comprise a section of piping along the fluid circuit wherein the resin is adhered or fixed to the inner lining of the piping. More commonly, the resin is provided in particulate or bead form which is caged within a canister or other suitable enclosure, hereinafter collectively referred to as a cartridge. Similarly, the nature of the fluid (e.g. gas, liquid, etc.) may also influence the design of the cartridge. For example, JP 2005-339814A discloses a suitable cartridge for use within a hydrogen gas recycle system for recycling at least a portion of unreacted hydrogen to the fuel cell. In instances where the fluid circuit includes both gas and liquid, the cartridge may be used with or incorporated as part of a gas-liquid separator such as disclosed in US 2007/0259241. Examples of other suitable designs include those described in U.S. Pat. No. 7,261,816. The cartridge may include additional components and features such as a bypass passage described in U.S. Pat. No. 7,097,763. The entire disclosures of U.S. Pat. No. 7,261,816; U.S. Pat. No. 7,097,763 and US 2007/0259241 are incorporated herein. The ion exchange filter is preferable located along the fluid flow path of one or more fluid circuits of the fuel cell system. The ion exchange filter may be located along the primary flow path or as part of a by-pass route from the primary flow path wherein flow through the filter is selectively controlled by values.

Figure 2:
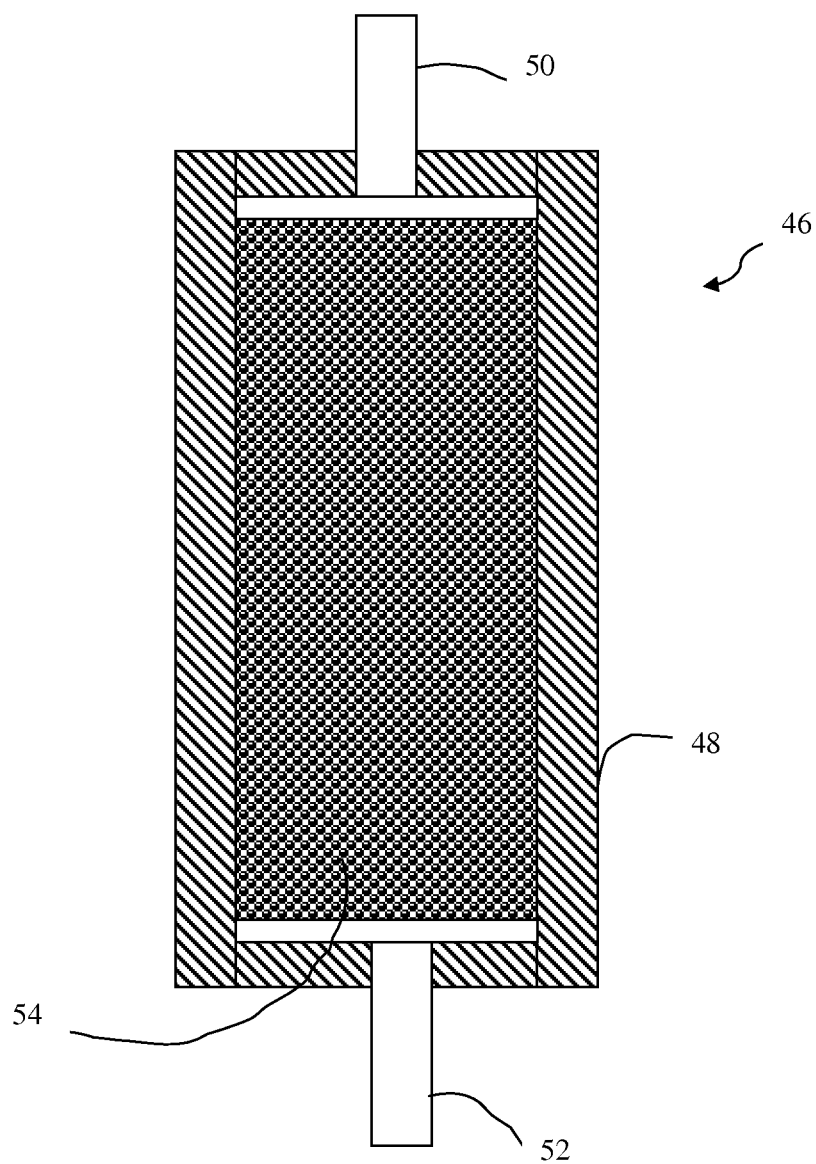
FIG. 2 is a cross-sectional view of an ion exchange filter according to an embodiment of the invention.

While not critical for understanding the present invention, the invention is further described with reference to FIG. 2. An ion exchange filter is generally shown at 46 including a cartridge 48, a fluid inlet 50, fluid outlet 52 and anion exchange resin 54 in bead form. In operation, fluid flows into the cartridge by way of the fluid inlet where it flows through the anion exchange resin and eventually exits the cartridge at the fluid outlet 52.

The ion exchange filter includes an anion exchange resin disposed within the cartridge. The filter may additionally include a cation exchange resin such as DOWEX MONOSPHERE™ 650C exchange resin in hydrogen form available from The Dow Chemical Company. While the anion exchange resin may be prepared in a carbonate form, it is preferred that the resin is prepared in a bicarbonate form, i.e. bicarbonate anions serving as the counter anions of the ion exchange resin. Those skilled in the art will appreciate the fact that both bicarbonate and carbonate ions are present in dynamic equilibrium, albeit in different ratios depending upon the pH conditions of the bulk fluid. The anion exchange resin of the present invention is not otherwise particularly limited but is preferably thermally stable at temperatures up to about 80° C., but preferably 100° C., and in some embodiments up to 120° C. The resin may be provided in a variety of well known forms, e.g. fibrous, granular, particulate, porous block, porous cylinder, etc., but is preferable provided in a spherical bead form as is common in the industry. The bead size is not particularly limited and can be selected based upon the operating conditions. Bead diameters of preferred anion exchange resins are from about 300 to 1000 microns. While not required, uniform particle size (UPS) resins may be used, or mixtures of beads sizes may be used. While both macroporous and gellular anion exchange resins may be used, gellular resins are preferred in most embodiments due to their toughness. In preferred embodiments of the invention, the anion exchange resin is provided in strong base form; however, weak base forms may be used along with combinations of both strong base and weak base anion exchange resins. The terms "strong base" and "weak base" forms are used herein consistent with their recognized meanings within the art. In sum, strong base anion exchange resins are capable of salt-splitting reactions, whereas weak base anion exchange resins show little or no salt-splitting capacity. Strong base anion exchange resins are highly ionized and can be used over the entire pH range. Weak base anion exchange resins are highly ionized only when in a salt form and, therefore, have ion exchange activity below pH 7. However, weak base resins may crosslink, e.g. via the pendant tertiary amine (e.g. during amination of a chloromethylated vinyl aromatic polymer) with an second chloromethylated aromatic group. The resulting quaternary nitrogen group can function as strong base group, albeit within a larger weak base anion exchange resin. Thus, weak base anion exchange resins may include strong base groups. When used in connection with the subject invention, a majority portion of such strong base groups are preferably converted to the bicarbonate or carbonate anionic form.

While the subject anion exchange resins may comprise a wide variety of polymers, vinyl aromatic polymers are preferred. These types of resins are commercially available and their production and use is well known in the art. A representative class of applicable vinyl aromatic polymers is described in U.S. Pat. No. 6,756,462, the entire disclosure of which is incorporated by reference. Such polymers are typically prepared by polymerizing vinyl aromatic monomers through suspension polymerization. Examples of such monomers include monounsaturated vinyl aromatic monomers such as: styrene, vinyltoluene, vinylxylene and $C_1$-$C_4$ alkyl substituted styrene and vinyl naphthalene (e.g. α-methylstyrene ethylvinylstyrene, isopropylstyrene, diethylstyrene, ethymethylstyrene, and dimethylstyrene) and mixtures thereof. Optionally, non-aromatic co-monomers may also be used including aliphatic unsaturated monomers such as: vinyl chloride, acyrlonitrile, methacrylonitrile and $C_1$-$C_4$ alkyl esters of (meth)acrylic acids (such as methyl acrylate). When used, the non-aromatic monomers typically comprise from about 0 to 20 weight percent based on the total monomer weight used to form the polymer. The subject polymers are preferably crosslinked. Crosslinking is generally accomplished by including a multifunctional aromatic monomer such as divinylbenzene, trivinylbenzene, divinyltoluene, divinylpyridine, divinylnaphthalene and divinylxylene. When used, such crosslinking monomers comprise from about 0.1 to 20, preferably about 0.5 to 10 weight percent based on the total monomer weight used to form the polymer. Divinylbenzene is the preferred crosslinking monomer. Non-aromatic crosslinking monomers may also be used, including but not limited to: ethyleneglycol diacrylate, ethyleneglycol dimethacrylate, trimethylol-propane, triacrylate, trimethylol-propane trimethacrlyate, diethyleneglycol divinyl ether, trivinylcyclohexane, 1,5-hexadiene, 2,5-dimethyl, 1,5-hexadiene, 1,7-octadiene and triallyl isocyanurate. A preferred vinyl aromatic polymer is derived from monomers comprising styrene and divinylbenzene comprising. A particularly preferred vinyl aromatic polymer is derived from about 0.1 to 20 weight percent divinylbenzene monomer and a majority portion (e.g. typically more than about 50 weight percent) of styrene monomer based on the total monomer weight used to form the polymer.

Vinyl aromatic polymers may be prepared using free-radical initiators, including monomer-soluble initiators such as azo-compounds (e.g. azobisisobutyronitrile) organic peroxides (benzoyl peroxide), hydroperoxides and related initiators as described in U.S. Pat. Nos. 4,192,921; 4,246,386;

4,283,499 and 6,756,462—the entire disclosures of which are incorporated herein by reference. Suitable dispersants and suspension stabilizers may also be used such as gelatin, polyvinyl alcohol, magnesium hydroxide, hydroxyethylcellulose, carboxy methyl methylcellulose and others as described in U.S. Pat. No. 4,419,245 the entire disclosure of which is incorporated herein by reference.

The crosslinked copolymer species of the subject vinyl aromatic polymers are preferably prepared by suspension polymerization of a finely divided organic phase comprising two or more of the aforementioned monomers (preferably including a multifunctional monomer functioning as a crosslinker), a free-radical initiator and optionally a phase-separating diluent. Phase-separating diluents are solvents for the monomers of the reaction but not the resulting copolymer. As such, the copolymer precipitates from the monomer phase as it is formed. Suitable phase-separating diluents are organic solvents which are substantially inert with respect to the suspending medium, monomers and resulting copolymer. Generally, organic solvents having boiling points of at least about 60° C. are suitable including: aliphatic hydrocarbons and aliphatic alcohols. Specific examples include hexane, heptane, iso-octane, tert-amyl alcohol and n-butanol. Further examples are provided in U.S. Pat. Nos. 6,290,854; 4,224,415; and 3,176,482, the entire disclosures of which are each incorporated herein by reference. The resulting crosslinked copolymers may be microporous, i.e. gellular, or macroporous depending upon whether a phase-separating diluent is utilized. The term "macroporous", "microporous" and/or "gellular" are well known in the art and refer to the nature of the copolymer porosity. Microporous or gellular copolymers have pore sizes on the order of less than about 20 Angstroms (Å), while macroporous copolymers typically have both mesopores of from about 20 Å to about 500 Å and macropores of greater than about 500 Å. Gellular and macroporous copolymers as well as their preparation are described in U.S. Pat. Nos. 5,231,115 and 4,256,840, both of which are incorporated herein in their entirety by reference.

In order to produce anion exchange resins, the aforementioned vinyl polymers are typically functionalized via a chloromethylation reaction, as is well known in the art. By way of example, a simplified reaction is depicted below wherein the term "vinyl" represents a portion of the polymer backbone, "Ar" represents a pendant aromatic ring and the combination represents a polymer repeating unit shown in brackets.

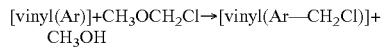

For purposes of the present invention, the specific means and conditions for chloromethylating vinyl aromatic polymer(s) is not particularly limited and many applicable techniques are documented in the literature. Chloromethylation is typically conducted by combining the vinyl aromatic polymer with a chloromethylation reagent in the presence of a catalyst at a temperature of from about 15 to 100° C., preferably 35 to 70° C. for about 1 to 8 hours. The most common and preferred chloromethylation reagent is chloromethyl methyl ether (CMME) and/or CMME-forming reactants such as the combination of formaldehyde, methanol and hydrogen chloride or chlorosulfonic acid, or hydrogen chloride with methylated formalin which are typically combined with the polymer in an amount of from about 0.5 to 20, preferably about 1.5 to 8 mole of CMME per mole of vinyl aromatic polymer. While less preferred, other chloromethylation reagents may be used including but not limited to: bis-chloromethyl ether (BCME), BCME-forming reactants such as formaldehyde and hydrogen chloride, and long chain alkyl chloromethyl ethers as described in U.S. Pat. No. 4,568,700. Catalyst useful for conducting chloromethylation reactions are well known and are often referred to in the art as "Lewis acid" or "Friedel-Crafts" catalyst. Nonlimiting examples include: zinc chloride, zinc oxide, ferric chloride, ferric oxide, tin chloride, tin oxide, titanium chloride, zirconium chloride, aluminum chloride and sulfuric acid along with combinations thereof. Halogens other than chloride may also be used in the preceding examples. A preferred catalyst is ferric chloride. The catalyst is typically used in an amount corresponding to about 0.01 to 0.2, preferably from about 0.02 to 0.1 mole catalyst per mole of vinyl aromatic polymer repeating unit. Catalyst may be used in combination with optional catalyst adjuncts such as calcium chloride and activating agents such as silicon tetrachloride. More than one catalyst may be used to achieve the desired chloromethylation reaction profile.

Solvents and/or swelling agents may also be used in the chloromethylation reaction. Examples of suitable solvents including but are not limited to one or more of: an aliphatic hydrocarbon halides such as ethylene dichloride, dichloropropane, dichloromethane, chloroform, diethyl ether, dipropyl ether, dibutyl ether and diisoamyl ether. When CMME is used as the chloromethylation agent, such solvents and/or swelling agents are often neither desired nor necessary.

In preparing an anion exchange resin, the chloromethylated vinyl aromatic polymer is typically filtered from the effluent, washed (e.g. with methanol, methylal, water), and reacted with an amine (e.g. trimethylamine, dimethylethanolamine, dimethylamine, etc.) to produce an anion exchange resin. A simplified reaction is depicted in the equation below.

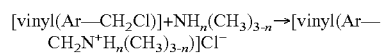

The resulting ion exchange resin may be gellular or macroporous, and are commonly used as weak base (n=1,2) and strong base (n=0) ion exchange resins; however, for purposes of the present invention, strong base anion exchange resins are preferred. For use in the present invention, the chlorinated form of the resin is converted to the bicarbonate form by washing the resin with a sodium bicarbonate solution, as generally depicted in the following equation:

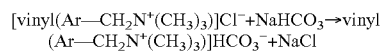

Other routes of conversion are also well known including converting the hydroxide form of an anion exchange resin via washing with sodium bicarbonate, e.g. washing DOWEX MONOSPHERE 550A™ available from The Dow Chemical Company with a sodium bicarbonate solution. The conversion (e.g. from hydroxide, chloride, or other anionic form) to the carbonate or bicarbonate form is preferably equal to or greater than about fifty percent of the anionic functional groups, preferably greater than about eighty percent, and more preferably greater than about ninety five percent.

Examples of anion exchange resins suitable for use in the present invention are well known for use as catalyst in the preparation of alkylene glycols, as described in U.S. Pat. Nos. 6,448,456; 6,211,419 and 5,488,184, the entire disclosures of which are incorporated herein by reference. These resins are known to possess good stability at high temperatures, see for example: Ion Exchange at the Millennium, Proceedings of IEX 2000, ed. J A Greig, ICP (2000), see pages 253-260; Ion Exchange Developments and Applications, Proceedings of IEX 1996, ed. J A Greig, SCI (1996), see pages 182-192; and Thermal Decomposition of Amberlite IRA-400, E. Baumann, Journal of Chemical and Engineering Data, Vol. 5, No. 3, July 1960, pages 376-382.

A preferred group of anion exchange resins comprise a polymer comprising a repeating unit represented by Formula I:

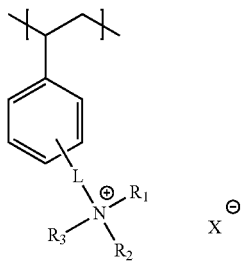

Formula I

The symbol "L" is located at the meta or para position (preferably para) of the ring and is selected from: a chemical bond between the nitrogen atom and an aromatic carbon atom (e.g. aniline-type structure), an alkyl group having from 1 to 4 carbon atoms, and an alkoxy group including from 1 to 4 carbon atoms. As noted in Ion Exchange at the Millennium, Proceedings of IEX 2000, ed. J A Greig, ICP (2000), see pages 253-260 and Ion Exchange Developments and Applications, Proceedings of IEX 1996, ed. J A Greig, SCI (1996) at pages 182-192, resins having a spacer arm, i.e. wherein "L" is an alkyl group or alkoxy group including multiple carbon atoms (e.g. —$CH_2OCH_2CH_3$) are known for possessing superior thermal stability. However, in many embodiments of the present invention, ethyl and methyl groups are often adequate or even preferred due to availability and/or lower cost. The symbols "$R_1$", "$R_2$" and "$R_3$" are each independently selected from: an alkyl group having from 1 to 4 carbon atoms (e.g. methyl, ethyl, propyl, isopropyl, butyl, etc.) and a hydroxy alkyl group having from 1 to 4 carbon atoms (e.g. —$CH_2$—OH, —$CH_2CH_2$—OH, etc.); however, methyl and ethyl groups are preferred in most embodiments. In yet another preferred embodiment, "$R_1$", "$R_2$" and "$R_3$" are all methyl groups. The symbol "X" is selected from a bicarbonate anion and carbonate anion. As previously noted, resins of this form are in dynamic equilibrium between the bicarbonate and carbonate form. Those skilled in the art commonly refer to either species singularly but it is understood that both anions are present. In the event that "X" is a carbonate anion, the formal charge is −2; whereas the formal charge of the bicarbonate anion is −1. Thus, the negative charge symbol associated with "X" in Formula I is intended to generically symbolize a negatively charged anion rather than a specific formal charge.

In a preferred embodiment, the present anion exchange resin comprises a polymer comprising a repeating unit of a represented by Formula II:

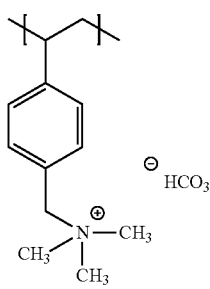

Formula II

While many anion exchange resins derived from styrene and DVB have been described, resins based upon other monomers may also be used, e.g. the copolymerization of vinylbenzylchloride with divinylbenzene. By way of further example, anion exchange resins may be derived from polymers comprising repeating units based upon pyridine rather than benzyl rings, as represented by Formula III.

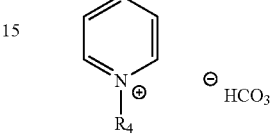

Formula III wherein $R_4$ is selected from: an alkyl group having from 1 to 4 carbon atoms (e.g. methyl, ethyl, propyl, isopropyl, butyl, etc.) and a hydroxy alkyl group having from 1 to 4 carbon atoms (e.g. —$CH_2$—OH, —$CH_2CH_2$—OH, etc.); however, methyl and ethyl groups are preferred in most embodiments.

The anion exchange resins represented in Formulae I, II and III preferably include additional repeating units, e.g. repeating units derived from polymerization with monomers such as DVB and/or ethylstyrene.

In a preferred embodiment, the anion exchange resin is a strong base anion exchange resin comprising a vinyl aromatic polymer derived from monomers comprising styrene and DVB, is gellular and in bead form.

EXAMPLES

The mechanical stability of a bicarbonate form anion exchange resin was compared with an hydroxide form by subjecting the resins to multiple freeze/thaw cycles. More specifically, a first sample of DOWEX MONOSPHERE™ 550A was converted into the hydroxide form by rinsing the resin with 500 ml of 1N NaOH. The resin was then removed from the NaOH and rinsed with de-ionized water. A second sample of DOWEX MONOSPHERE™ 550A was converted into the bicarbonate form by rinsing the resins with 500 ml of 10% $NaHCO_3$. The resin was removed from the $NaHCO_3$ and rinsed with de-ionized water. Several aliquots of each sample were placed into separate compartments of a standard ice cube tray. 10 ml of water added to one compartment of each sample so that the resin was immersed in water. The compartments holding the other portions of each sample was only moistened with any excess water removed. The samples were then placed in a freezer at approximately −20° C. until completely frozen (i.e. about 3 hours). The tray was subsequently removed from the freezer and allowed to thaw to room temperature (approximately 22° C.). This freeze/thaw cycle was repeated a total of 15 cycles. The samples were examined for the percentage of whole beads remaining after 5, 10 and 15 cycles. The results are summarized in Tables I and II below.

TABLE I

| Anionic form of DOWEX MONOSPHERE ™ 550A | Virgin resin | Percent of Whole Beads in Immersed Samples | | |
|---|---|---|---|---|
| | | After 5 cycles | After 10 cycles | After 15 cycles |
| Bicarbonate | 100 | 98 | 96 | 86 |
| Hydroxide | 100 | 21 | 25 | 7 |

TABLE II

| Anionic form of DOWEX MONOSPHERE ™ 550A | Virgin resin | Percent of Whole Beads in Moistened Samples | | |
|---|---|---|---|---|
| | | After 5 cycles | After 10 cycles | After 15 cycles |
| Bicarbonate | 100 | 97 | 90 | 82 |
| Hydroxide | 100 | 30 | 38 | 28 |

As is shown by the comparative data provided in Tables I and II, the bicarbonate form resin demonstrated superior mechanical properties as compared with the hydroxide form anion exchange resin.

The chemical stability of several bicarbonate form anion exchange resins were compared with hydroxide forms by subjecting samples of both forms of resin to elevated thermal conditions. More specifically, a first 25 ml of sample of each resin was converted into the hydroxide form by rinsing the resin with 500 ml of 1N NaOH. The resin was then removed from the NaOH and rinsed with de-ionized water. A separate 25 ml sample was converted into the bicarbonate form by rinsing the resin with 500 ml of 10% $NaHCO_3$. The resin was removed from the $NaHCO_3$ and rinsed with de-ionized water. A 10 ml aliquot of the hydroxide and bicarbonate samples were placed into separate sealed bottles and placed in an oven at 120° C. for 19 hours. After incubation at elevated temperature, the bottles were allowed to cool to room temperature and the resins tested by conventional ion exchange test methods and compared with the unheated control sample (in hydroxide form). The results are summarized in Table III.

Sample A corresponded to DOWEX MONOSPHERE™ 550A, a styrenic strong base (type 1) gellular type resin commercially available from The Dow Chemical Company.

Sample B corresponded to DOWEX MARATHON™ A2, a styrenic strong base (type 2) gellular type resin commercially available from The Dow Chemical Company.

Sample C corresponded to DOWEX MARATHON™ MSA, a styrenic strong base (type 1) macroporous type resin commercially available from The Dow Chemical Company.

Sample D corresponded to AMBERLITE IRA™ 458, an acrylic strong base (type 1) gellular type resin commercially available from the Rohm & Haas Company.

TABLE III

| Resin Sample | Anionic Form | Salt Splitting Capacity (meq/ml) | Weak Base Capacity (meq/ml) | Total Exchange Capacity (meq/ml) | Water retention Capacity (%) | Percent loss of SBA* Capacity |
|---|---|---|---|---|---|---|
| A | control | 1.4 | 0 | 1.4 | 48.8 | — |
| A | $OH^-$ | 1.2 | 0 | 1.2 | 50.9 | 14% |
| A | $HCO_3$ | 1.3 | 0 | 1.3 | 50.2 | 7% |
| B | control | 1.2 | 0 | 1.2 | 48.7 | — |
| B | $OH^-$ | 0 | 0.9 | 0.9 | 47.1 | 100% |
| B | $HCO_3$ | 1.1 | 0 | 1.1 | 49.8 | 8% |
| C | control | 1.1 | 0 | 1.1 | 63.1 | — |
| C | $OH^-$ | 0.8 | 0 | 0.9 | 64.7 | 27% |
| C | $HCO_3$ | 0.9 | 0 | 0.9 | 64.8 | 18% |
| D | control | 1.2 | 0 | 1.2 | 58 | — |
| D | $OH^-$ | 0.1 | 0 | 0.1 | 70 | 92% |
| D | $HCO_3$ | 0.8 | 0 | 0.7 | 65.8 | 33% |

*The acronym SBA corresponds to strong base anion.

As is shown by the comparative data provided in Table III, the bicarbonate form resin demonstrated superior chemical stability as compared with the hydroxide form anion exchange resin.

The invention claimed is:

1. A fuel cell system comprising:
   a fuel cell,
   a fluid circuit defining a fluid loop for re-circulating fluid within the fuel cell system, and
   an ion exchange filter positioned along said fluid circuit, wherein the filter comprises:
   a cartridge including a fluid inlet and outlet, and
   a strong base anion exchange resin disposed within said cartridge; wherein the resin is: in bead form with a bead diameter of from about 300 to 1000 microns, derived from monomers comprising styrene and divinylbenzene, and comprises a repeating unit represented by Formula I:

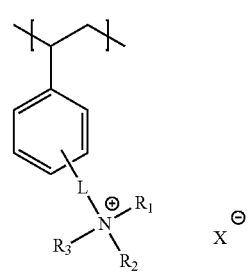

Formula I wherein:
   L is located at the meta or para position of the ring and is selected from: a chemical bond between the nitrogen atom and an aromatic carbon atom or a methyl or ethyl group;
   $R_1$, $R_2$ and $R_3$ are each independently selected from: a methyl or ethyl group; and
   X is selected from at least one of: a bicarbonate anion and carbonate anion.

2. The fuel cell system of claim 1 wherein said fluid circuit comprises at least one of:
   a coolant system comprising a coolant circulating between a heat exchanger and said fuel cell,
   a humidifying system for returning at least a portion of water produced by said fuel cell back to said fuel cell;
   a fuel recycle system for recycling at least a portion of unreacted fuel to said fuel cell; and
   an oxidant recycle system for recycling at least a portion of unreacted oxidant to said fuel cell.

3. The fuel cell system of claim 2 wherein said fuel recycle system comprises piping for transferring unreacted hydrogen exhaust gas from said fuel cell and returning at least a portion of said unreacted hydrogen to said fuel cell.

4. The fuel cell system of claim 1 wherein said fuel cell system is vehicle mounted.

5. The fuel cell system of claim 1 wherein said anion exchange resin is gellular.

6. The fuel cell system of claim 1 further comprising a cation exchange resin disposed within said cartridge.

7. The fuel cell system of claim 1 where L is located at the para position of the ring.

8. The fuel cell system of claim 1 wherein said anion exchange resin comprises a polymer comprising a repeating unit represented by Formula II:

Formula II

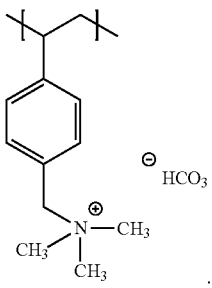

* * * * *